United States Patent [19]

Ohba

[11] Patent Number: 4,956,706
[45] Date of Patent: Sep. 11, 1990

[54] APPARATUS FOR PROCESSING IMAGE

[75] Inventor: Akio Ohba, Kanagawa, Japan

[73] Assignee: Sony Corporation, Tokyo, Japan

[21] Appl. No.: 367,372

[22] Filed: Jun. 16, 1989

[30] Foreign Application Priority Data

Jun. 21, 1988 [JP] Japan .................. 63-152855

[51] Int. Cl.⁵ .............................. H04N 5/262
[52] U.S. Cl. .................. 358/93; 358/160; 358/180; 358/903
[58] Field of Search ............... 358/93, 160, 180, 903

[56] References Cited

U.S. PATENT DOCUMENTS

| 4,667,236 | 5/1987 | Dresdner | 358/160 |
| 4,831,445 | 5/1989 | Kawabe | 358/160 |
| 4,875,097 | 10/1989 | Jackson | 358/180 |

FOREIGN PATENT DOCUMENTS

WO88/02517  4/1988  PCT Int'l Appl. .
1310659     3/1973  United Kingdom .
2127649A    4/1984  United Kingdom .
2149258A    6/1985  United Kingdom .

Primary Examiner—Howard W. Britton
Attorney, Agent, or Firm—Philip M. Shaw, Jr.

[57] ABSTRACT

In an apparatus for processing image capable of moving the position of visual point with respect to an image displayed on a monitor, the apparatus, based on coordinates of picture elements on the image pickup device of a camera and the image pickup angle of the camera with respect to the object, produces a model of a surface of an object whose image has been picked up in a three-dimensional coordinate system, maps image data output from the camera onto the model, rotationally transforms the model with the image data mapped thereon in the three-dimensional coordinate system, and displays the models with the image data mapped thereon on the monitor.

8 Claims, 7 Drawing Sheets

APPARATUS FOR PROCESSING IMAGE

BACKGROUND OF THE INVENTION

1. Field of the Invention

The present invention relates to an image processing apparatus and more particularly to an image processing apparatus adapted such that the position of the visual point with respect to the picture image picked up with a television camera and displayed on a monitor is optionally changeable.

2. Description of the Prior Art

In television broadcasting or the like, to enable an object on the ground to be viewed from a plurality of positions of visual point, it has so far been practiced to dispose the television camera in elevated positions, with the use of a crane or scaffold for picture taking so as to change the image pickup position of the television camera and hence the position of the visual point. By relying on such conventional means alone, however, it sometimes becomes impossible to change the position of visual point because the of crane or the scaffold cannot be installed due to the conditions at the place where the picture is taken.

OBJECTS AND SUMMARY OF THE INVENTION

Objects

A primary object of the present invention is to provide an image processing apparatus in which the position of the visual point with respect to an object on the ground displayed on a monitor is made optionally changeable without changing the image pickup position of the television camera.

Another object of the present invention is to provide an image processing apparatus in which any unnatural aspect produced in the picture image when the position of visual point is moved with respect to the object displayed on a monitor can be corrected.

Summary

To achieve these objects, the present invention, in an image processing apparatus in which the position of the visual point with respect to the picture image displayed on a monitor is movable, produces a model of the picked-up image of a surface of the object in a three-dimensional coordinate system based on the coordinates of picture elements on the image pickup device of the camera and the image pickup angle of the camera with respect to the object, maps the picture data output from the camera onto the model produced as above, applies a rotational transformation to the model with the video data mapped thereon in the three-dimensional coordinate system, and thereupon, displays the model with the picture data mapped thereon.

In addition, the present invention also deforms an area at a desired position in the model produced in a three-dimensional coordinate system based on the coordinates of picture elements on the image pickup device of the camera and the image pickup angle of the camera with respect to the object to thereby corrects the unnaturalness in the displayed picture image.

DETAILED DESCRIPTION OF THE PREFERRED EMBODIMENT

Figure 1:
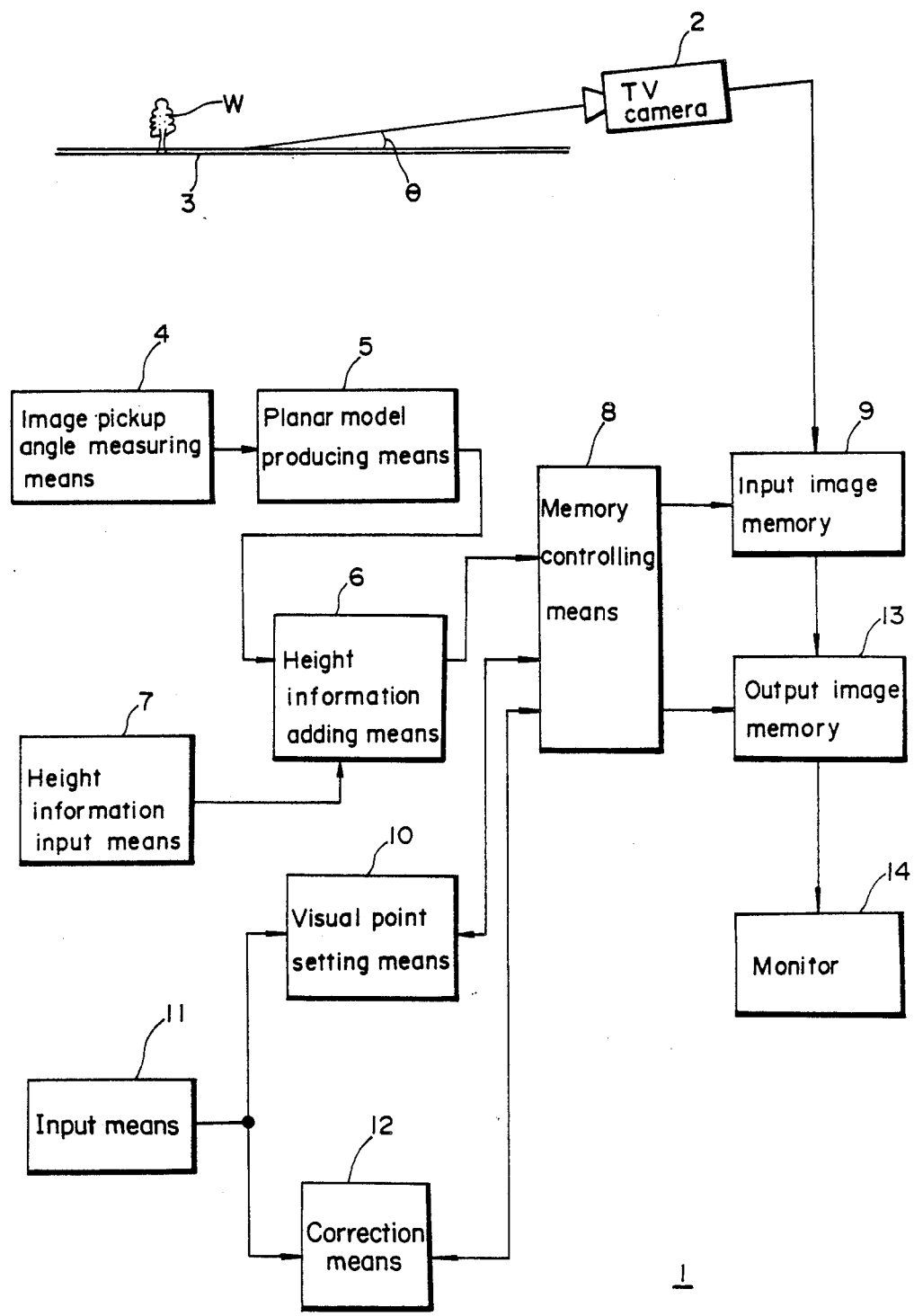
FIG. 1 is a block diagram showing an embodiment of the present invention.

The structure of the image processing apparatus 1 according to the present invention will be described below with reference to FIG. 1. An image of an object such as a golf course 3 is picked up by a television camera 2. At this time, the television camera 2 is fixed and the image pickup angle is $\theta$. The image pickup angle is measured by an image pickup angle measuring means 4 and supplied to a planar model producing means 5. The planar model producing means 5 produces a planar model based on the input image pickup angle $\theta$. The data representing the planar model produced by the planar model producing means 5 is supplied to a height information adding means 6. The height information adding means 6 modifies the data representing the planar model based on height information delivered from a height information input means 7 to thereby produce data representing a model having varying height. The data representing the model having varying height is supplied to a memory controlling means 8. A video signal output from the television camera 2 is supplied to an input image memory 9 and stored therein such that picture elements are each stored at predetermined addresses. Meanwhile, a visual point setting means 10 produces visual point setting data based on visual point controlling data received from an input means 11 and supplies the visual point setting data to the memory controlling means 8. A correction means 12 produces correction data based on correction control data received from the input means 11 and supplies the correction data to the memory controlling means 8. The memory controlling means 8, based on the data representing the model having varying height supplied from the height information adding means 6, the visual point setting data supplied from the visual point setting means 10, and the correction data supplied from the correction means 12, produces read addresses for the input image memory 9 and write addresses for an output image memory 13. The read addresses for the input image memory 9 and write addresses for the output image memory 13 are respectively supplied to the input image memory 9 and output image memory 13, whereby the video signal stored in the input image memory 9 is read and stored at predetermined addresses of the output image memory 13. The video signals read out of the output image memory 13 are supplied to a monitor 14 and displayed on its monitor screen.

Using the example of picking up an image of a golf course 3 or the like with the television camera 2, the principle of the image processing apparatus 1 producing a planar model in a three-dimensional coordinate system based on the image pickup angle $\theta$ at that time and mapping a video signal output from the television camera 2 onto the planar model disposed in the three-dimensional coordinate system will be described below.

Figure 2:
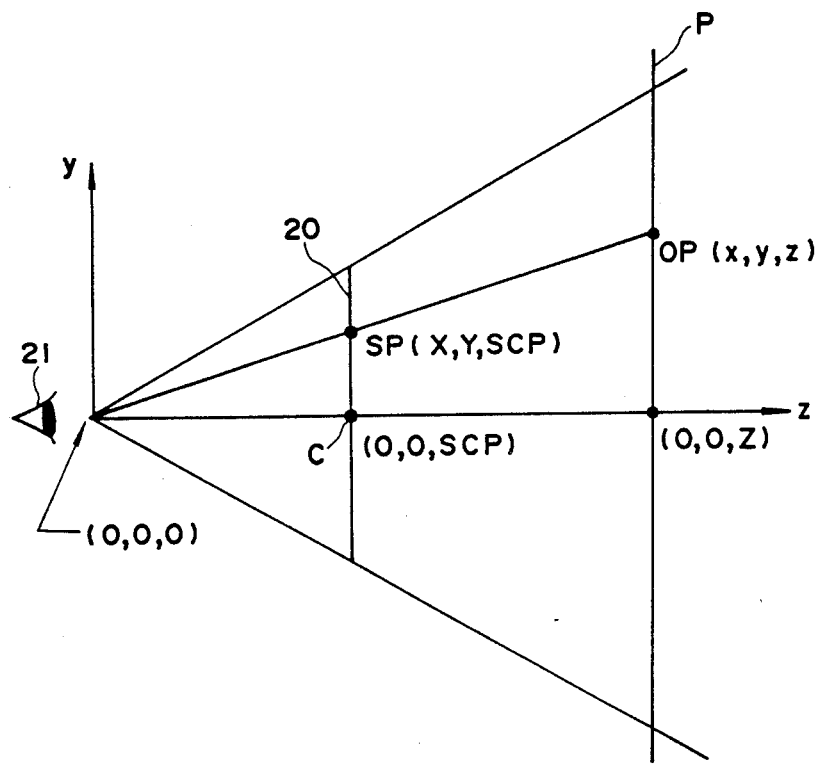
FIG. 2 and FIG. 3 are diagrams explaining the principle of production of a planar model in a three-dimensional coordinate system as performed in the present invention.

FIG. 2 shows how an image of an object on a plane P is picked up by a television camera 2 set in the direction perpendicular to the plane P, and perspectively transformed onto the image pickup device (screen 20) of the television camera 2. Conversely, the real position of the object whose image is picked up by the television camera 2 is on the plane P located at a specific distance from the screen 20 in the direction opposite to the position of visual point 21. Therefore, when the position OP of the object on the plane P is represented by (x, y, z), the position of visual point 21 is taken as the origin (0, 0, 0), the center C of the screen 20 is represented by (0, 0, SCP), and the position SP of the object perspectively transformed onto the screen 20 is represented by (X, Y, SCP), the relationship between the position OP of the object on the plane P and the position SP of the object perspectively transformed onto the screen 20 is expressed by the following equations $$X = \frac{SCP * x}{Z}, \quad (1)$$

$$Y = \frac{SCP * y}{Z}. \quad (2)$$

Figure 3:
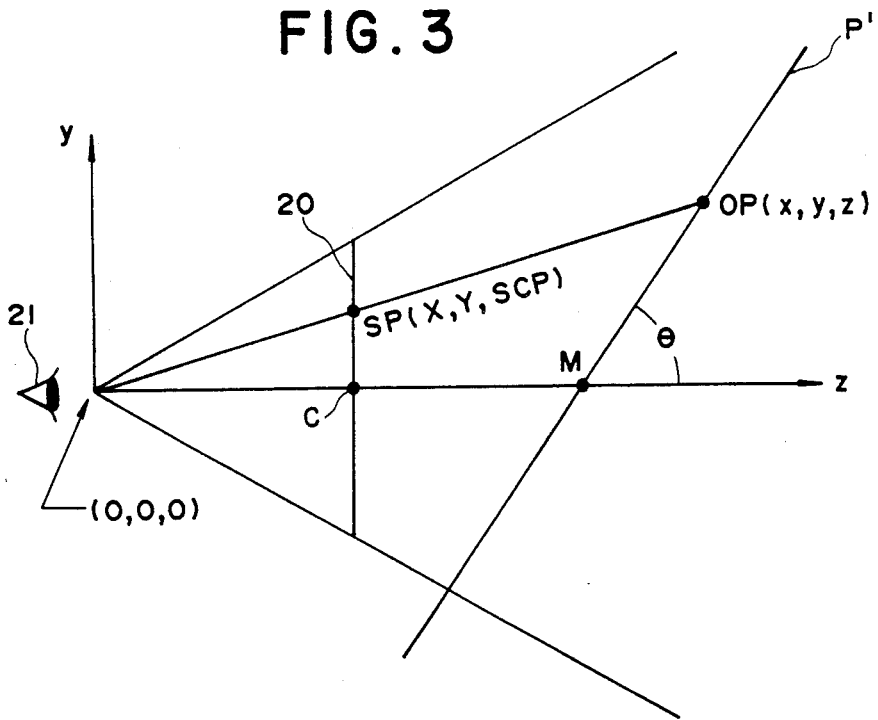

In FIG. 3, a plane P' which is an inclined plane of the plane P shown in FIG. 2 by a predetermined angle is shown. Assuming that this plane P' is inclined by an angle $\theta$ with respect to the x - z plane at position M, the relationship between the position OP of an object on the plane P' and the position SP of the object perspectively transformed on the screen 20 is expressed by the following equations $$X = \frac{SCP * x}{Z + y \cos \theta}, \quad (3)$$

$$Y = \frac{SCP * y * \sin \theta}{Z + y \cos \theta}. \quad (4)$$

By solving the equations (3) and (4) for x and y, we obtain $$x = \frac{X * Z + X * y * \cos \theta}{SCP}, \quad (5)$$

$$y = \frac{Y * Z}{SCP * \sin \theta - Y * \cos \theta}. \quad (6)$$

And then, z becomes $$z = Z + y * \cos \theta. \quad (7)$$

As apparent from equations (5), (6), and (7), by measuring the image pickup angle $\theta$ of the television camera 2 with respect to the plane P' at the time when the image of the plane P' is picked up with the television camera 2, and substituting the angle $\theta$ and the position (X, Y, SCP) of each picture element of the object perspectively transformed onto the screen 20 into equations (5), (6), and (7), the plane P' in the three-dimensional coordinate system can be calculated. Here, Z is the distance from the position of visual point 21 to the position M on the plane P'. This distance is equal to the distance between the point at which the optical axis of the camera 2 intersects with the golf course 3 and the camera. Hereinafter, the plane P' produced as described above will be called "planar model P'".

By assigning video data of picture elements of the object perspectively transformed onto the screen 20 to the corresponding coordinates on the planar model P' produced as described above, the mapping of the video data onto the planar model P' in the three-dimensional coordinate system is achieved. Thus, when picking up the image of the object on the plane P, it is possible to produce in the three-dimensional coordinate system the has the video data and planar model P', which is inclined with respect to x - z plane by the same angle as the image pickup angle $\theta$ of the television camera 2. The video data mapped onto the planar model P' disposed in the three-dimensional coordinate system is supplied to the monitor 14 shown in FIG. 1 to be displayed thereon.

As described above, by adding arbitrary values, which are mutually associated, to the coordinate values corresponding to the positions of the picture elements of the planar model P' disposed in the three-dimensional coordinate system, the planar model P' can be rotationally transformed in the three-dimensional coordinate system. It is thus possible to change the position of the visual point with respect to the planar model P' displayed on the monitor 14.

Therefore, even if the image pickup angle $\theta$ of the television camera 2 with respect to the golf course 3 is fixed as shown in FIG. 1, the position of visual point with respect to the golf course 3 displayed on the monitor 14 can be changed. Hence, it is easy to change the position of the visual point such that it appears as if the television camera 2 were raised higher to pick up the image of the golf course 3 from above. More particularly, when there is picture information, for example, as shown in FIG. 4, as a picture image picked up by a television camera 2, a picture for which the position of visual point is moved higher above as shown in FIG. 5 can be obtained without changing the image pickup angle $\theta$ of the television camera 2.

Thus, according to the present invention, the position of the visual point can be determined at will and it is thus easy to change the perspective of the view.

Figure 4:
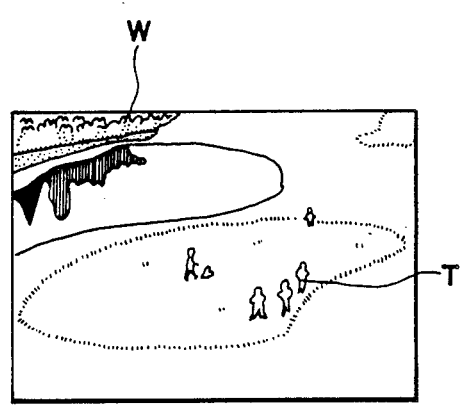
FIG. 4 is a diagram showing an example of a picture image picked up by the camera in the present invention.
Figure 5:
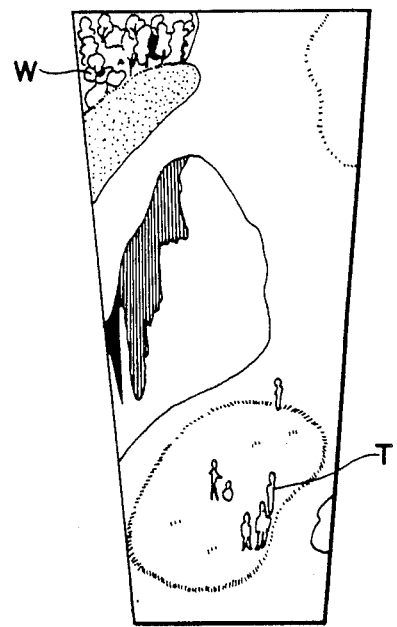
FIG. 5 is a diagram showing the picture image shown in FIG. 4 with respect to which the position of the visual point has been moved according to the present invention.

When the position of the visual point is optionally changed as described above, however, since the planar model P' is formed with the object such as the golf course 3 approximated to a plane, those parts of the image that are not actually on the plane P', such as trees W and humans T in the picture image in FIGS. 4 and 5, make the image unnatural when the position of the visual point is moved.

Figure 6A:
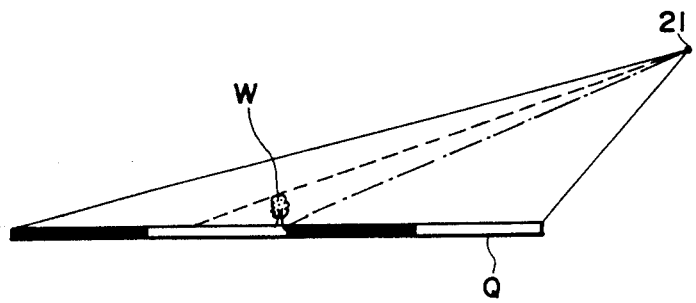
FIGS. 6A-F show diagrams explaining the principle of correction of unnatural portions in the picture image shown in FIG. 5.
Figure 6B:
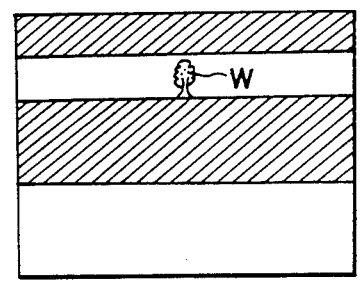
Figure 6C:
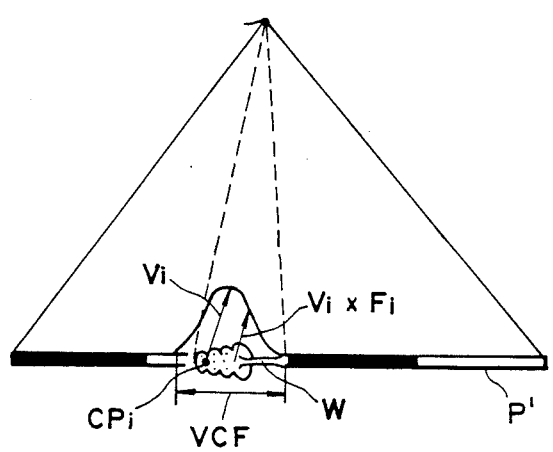
Figure 6D:
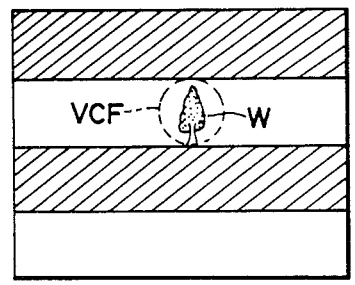

An image of such an object as a tree W standing on the ground Q picked up with a television camera 2 from a position of visual point 21 as shown in FIG. 6A being displayed on the monitor 14 is shown in FIG. 6B. If, as shown in FIG. 6C, the position of visual point 21 with respect to the object displayed on the monitor 14 is brought to the position above the object as described above, the length of the tree W will be prolonged as shown in FIG. 6D. This is because the condition of the television camera 2 picking up the image of the object as shown in FIG. 6A is nothing but the condition, as shown in FIG. 6C, of its picking up the image of the tree W lying on the ground Q shown in FIG. 6A.

The method to correct the length of the standing tree W or human being T will be described below. As the means for correction, the technique proposed earlier by the present applicant and described in U.S. Pat. No. 4,791,581 is used.

First, an area VCF to be deformed is defined within the planar model P' as shown in FIG. 6C and FIG. 6D. Then, a deformation vector $V_i$ having direction and quantity of deformation is set up. Further, a point of action $CP_i$ indicating the position to apply the deformation and a vector field function $F_i$ are set up. Then, representing the position vector of the planar model P' before the deformation by $P_O$, the position vector $P_N$ of the planar model P' after the deformation is given by $$P_N = P_0 + \sum_{i=1}^{N} V_i * F_i (P_{i-1}, CP_i). \quad (8)$$

Figure 6E:
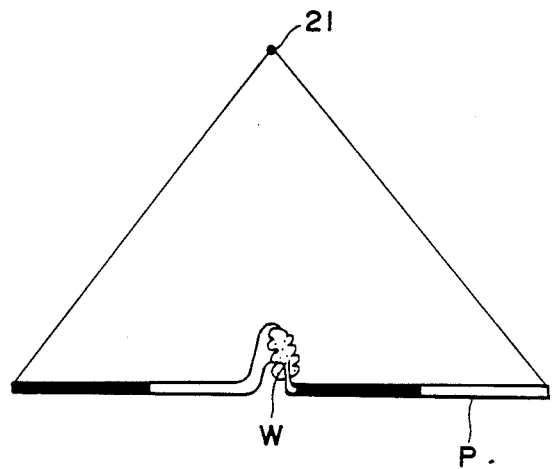
Figure 6F:
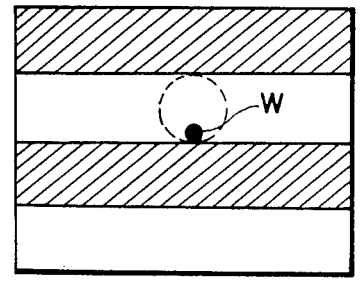

The state of the planar model P' deformed as above is shown in FIG. 6E. That is, the tree W is now set upright. Thus, as shown in FIG. 6F, the prolonged state of the tree W is corrected, and thereby, the ground Q and the tree are displayed on the monitor 14 in the same state as that where the television camera 2 is brought to the position right above the tree.

Figure 7:
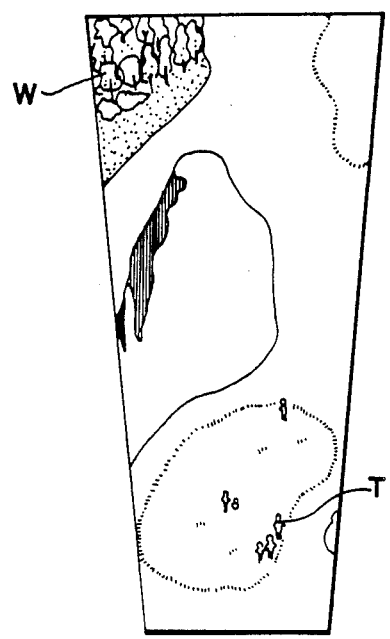
FIG. 7 is a diagram showing a picture image after the unnatural portions have been corrected in the picture image shown in FIG. 5.

By performing the correction as described above, the picture image having humans T and trees W made longer than real size can be corrected and thus the picture as shown in FIG. 7 can be obtained.

Figure 8:
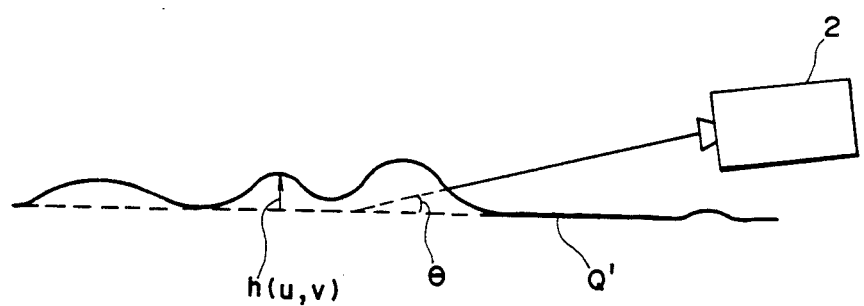
FIG. 8 and FIG. 9 are diagrams explaining the principle of production of a model having ups and downs in a three-dimensional coordinate system according to the present invention.
Figure 9:
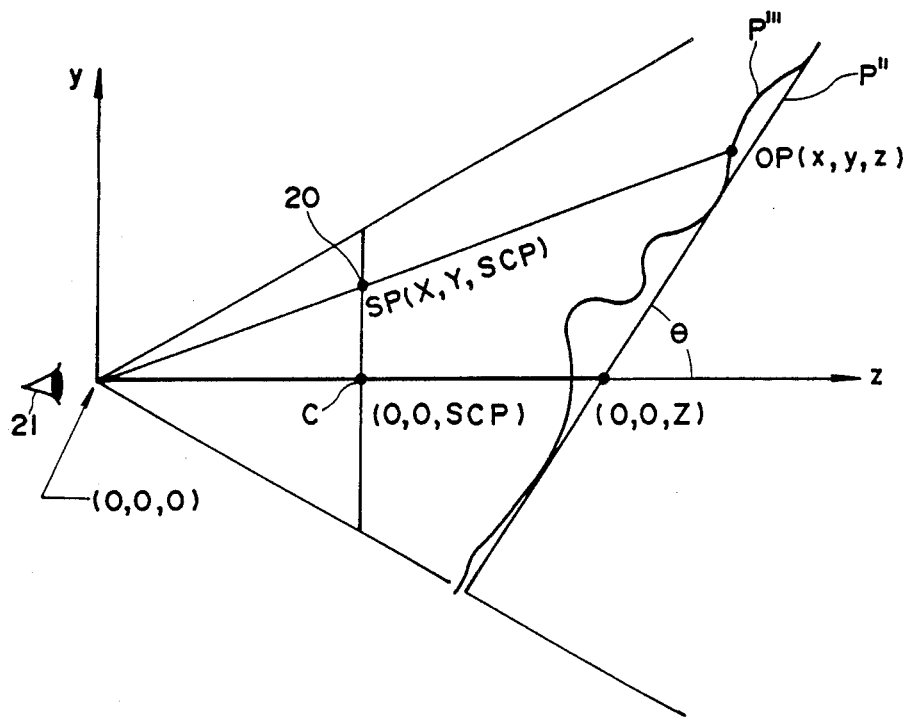

Now, referring to FIG. 8, the case where heights h(u, v) of an object such as the ground Q' are given by such an information source as a topographical map will be described. First, as described above, by substituting the image pickup angle $\theta$ of the television camera 2 with respect to the ground Q' and the positions (X, Y, SCP) of the picture elements of the object perspectively transformed onto the screen 20 into equations (5), (6) and (7), a planar model P'' in the three-dimensional coordinate system is obtained as shown in FIG. 9. Then, the thus produced planar model P'' is deformed based on the data h(u, v) representative of the height at an arbitrary position (x, y, z) of the planar model P''. The coordinates (x, y, z) of an arbitrary position in the three-dimensional coordinate system of the planar model P'' after the deformation are calculated from $$x = \frac{X * Z + X * y * \cos \theta}{SCP}, \quad (9)$$

$$y = \frac{Y * Z}{SCP * \sin \theta - Y * \cos \theta} + h(u, v) * \cos \theta, \quad (10)$$

$$z = Z + y * \cos \theta + h(u, v) * \sin \theta. \quad (11)$$

These equations can be derived from equations (6) and (7) by adding components along y axis and z axis of the height h(u, v) of the object to their right-hand sides, respectively. By using the above mentioned equations (9), (10), and (11), a model p''' having varying height corresponding to the object in the three-dimensional coordinate system as shown in FIG. 9 can be produced. Further, by the use of equations (9), (10), and (11), it is possible to uniquely associate positions of the picture elements of the object perspectively transformed onto the screen 20 with coordinates of the model p''' having varying height. Therefore, by assigning video data of the picture elements of the object perspectively transformed onto the screen 20 to the corresponding coordinates of the model p''' having varying height, it is possible to map the video data onto the model p''' having varying height in the three-dimensional coordinate system. Thus, when picking up the image of the object on the ground Q', the model p''' having varying height which has the video data is inclined with respect to x - z plane by the same angle as the image pickup angle $\theta$ of the television camera 2 can be produced in the three-dimensional coordinate system. The video data of the model p''' having varying height disposed in the three-dimensional coordinate system is supplied to the monitor 14 shown in FIG. 1 and displayed on the same.

As described above, by adding optional values which are mutually associated to the coordinates corresponding to positions of the picture elements of the model p''' having varying height and disposed in the three-dimensional coordinate system, the model p''' having varying height and disposed in the three-dimensional coordinate system can be rotated. That is, the angle of inclination of the model p''' having varying height with respect to x - z plane can be optionally changed. Therefore, when the video data of the model p''' having varying height and arranged in the three-dimensional coordinate system is displayed on the monitor 14, the orientation of the displayed model P''' having varying height can be changed. In other words, the position of the visual point with respect to the model P''' can be changed.

Figure 10:
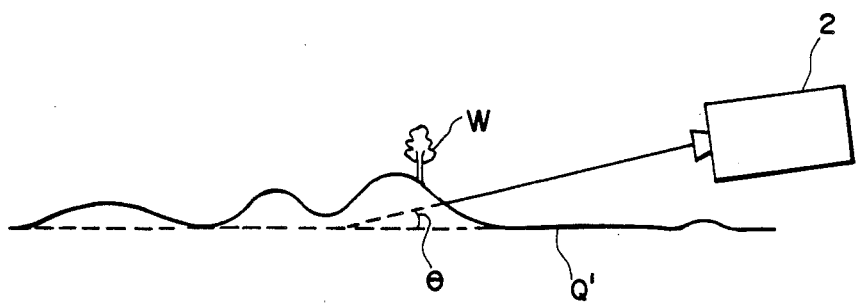
FIG. 10 is a diagram explaining how a portion of the image becomes unnatural after the position of visual point has been moved according to the present invention.

At the time the position of the visual point with respect to the model P''' having varying height is changed as described above, if there is a tree W on the ground Q' as shown in FIG. 10, the length of the tree W will become too large when the position of visual point is raised. This is because data is generally not included expressing heights of trees W in the information of the height of the ground obtained from a topographical map or the like, and therefore, when producing the model P''' having varying height, the heights of trees W are neglected and they are considered to be lying on the ground.

The length of the tree W becoming too large when the position of the visual point is raised can be corrected in the same way as described above using FIG. 6. First, an area VCF to be deformed is defined in the model P''' having varying height. Then, a deformation vector $V_i$ having direction and quantity of deformation is set up. Further, a point of action $CP_i$ indicating the position to apply the deformation and a vector field function $F_i$ are set up. Then, by representing the position vector of the model P''' having varying height before the deformation by $P_O$, the position vector $P_N$ of the model P''' having varying height after the deformation is calculated by the use of equation (8). Thereafter, the model P''' having varying height is further deformed according to the position vector $P_N$ and thereby the length of the tree W can be corrected.

When the heights h(u, v) of the object such as the ground Q' are given by an information source such as a topographical map, by producing a model P''' having varying height as described above and mapping the video data onto the same, the height of the ground after the position of the visual point has been changed can be correctly displayed on the monitor 14.

Figure 11:
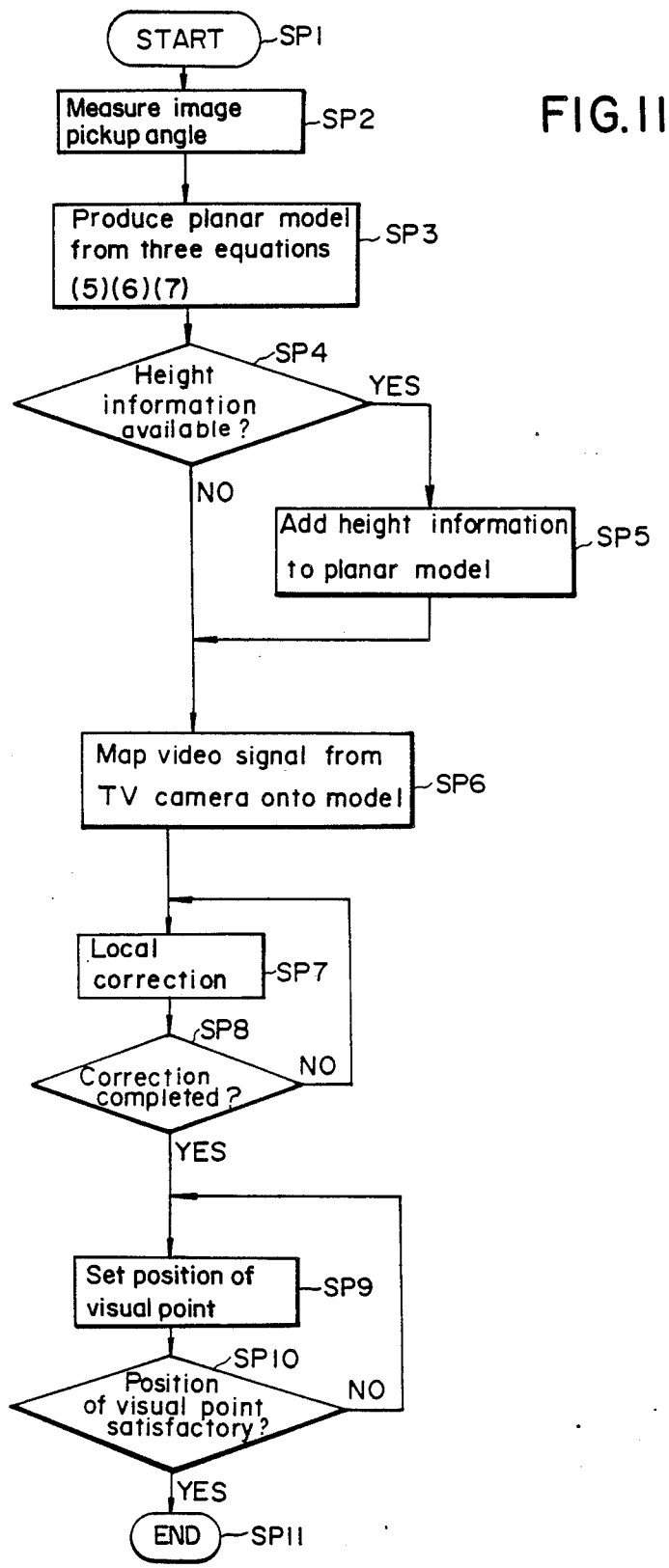
FIG. 11 is a flow chart explaining the manner of operation of the means for image processing shown in FIG. 1.

The manner of operation of the image processing apparatus 1 of the present invention shown in FIG. 1 will be described with reference to FIG. 11.

At step SP1 the image processing apparatus 1 starts to operate.

At step SP2, the image pickup angle measuring means 4 measures the image pickup angle $\theta$ of the television camera 2 with respect to the object such as a golf course 3. The image pickup angle $\theta$ may also be measured manually by the operator. The image pickup angle $\theta$ measured through the image pickup angle measuring means 4 is supplied to the planar model producing means 5.

At step SP3, the planar model producing means 5 produces a planar model P' in the three-dimensional coordinate system by substituting the image pickup angle $\theta$ and the positions (X, Y, SCP) of the picture elements of the object perspectively transformed onto the image pickup device of the television camera 2 into equations (5), (6), and (7). The data representative of the planar model P' calculated in the planar model producing means 5 is supplied to the height information adding means 6.

At step SP4, it is determined whether or not there is information about the varying height of the golf course 3 or the like. When it is determined that there is information concerning height at step SP4, the data representative of the varying height is input through the height information input means 7 to the height information adding means 6 at step SP5. The height information adding means 6 adds the data representing the height to the data representative of the planar model P' calculated in the planar model producing means 5, as indicated in equations (9), (10), and (11). When it is determined that there is no information about height at step SP4, the data representative of the planar model P' calculated in the planar model producing means 5 is directly supplied to the memory controlling means 8.

At step SP6, the memory controlling means 8, based on the data supplied from the height information adding means 6 or the planar model producing means 5, produces read addresses for the input image memory 9 and write addresses for the output image memory 13 and supplies these addresses to the input image memory 9 and output image memory 13, respectively. The video signal supplied from the television camera 2 and stored in the input image memory 9 is read out according to the read addresses supplied from the memory controlling means 8, and written into the output image memory 13 according to the write addresses supplied from the memory controlling means 8. Through this process, video data of picture elements of the object perspectively transformed onto the screen 20 can be assigned to the corresponding coordinates of the planar model P' or the model P''' having varying height. This operation is the mapping.

At step SP7, the data representing the deformed area VCF, data representing the deformation vector $V_i$ indicating the direction and quantity of the deformation, and data representing the point of action $CP_i$ indicating the position where the deformation is performed and the vector field function $F_i$ are supplied through the input means 11 to the correction means 12. Also supplied to the correction means 12 is the data representing the position vector $P_O$ of the planar model P' before the deformation or the data representing the position vector $P_O$ of the model P''' having varying height before the deformation from the memory controlling means 8. The correction means 12, responsive to the incoming data, calculates the position vector $P_N$ of the planar model P' after the deformation or the position vector $P_N$ of the model P''' having varying height after the deformation by the use of equation (8). The data representing the calculated position vector $P_N$ of the planar model P' after the deformation or position vector $P_N$ of the model P''' having varying height after the deformation are supplied to the memory controlling means 8. The memory controlling means 8, based on the data representing the position vector $P_N$ supplied from the correction means 12, produces the read addresses for the input image memory 9 and the write addresses for the output image memory 13 and supplies these addresses to the input image memory 9 and the output image memory 13, respectively. The video signal stored in the input image memory 9 is read out again according to the read addresses supplied from the memory controlling means 8 and written into the output image memory 13 according to the write addresses supplied from the memory controlling means 8. Through the described process the planar model P' or the model P''' having varying height can be adjusted so that the lengths of the humans T and trees W are corrected.

At step SP8, it is determined whether or not the correction at step SP7 has been completed. The process at this step 8 is performed by the operator determining whether or not the picture image displayed on the monitor 14 has been brought into a desired state.

At step SP9, visual point controlling data is supplied through the input means 11 to the visual point setting means 10, and the visual point setting means 10 in turn adds the values corresponding to the visual point controlling data to the coordinates of the planar model P' or coordinates of the model P''' having varying height supplied from the memory controlling means 8 to thereby produce visual point setting data. The visual point setting data is supplied to the memory controlling means 8. The memory controlling means 8, based on the visual point setting data supplied from the visual point setting means 10, produces the read addresses for the input image memory 9 and the write addresses for the output image memory 13 and supplies these addresses to the input image memory 9 and the output image memory 13, respectively. The video signal stored in the input image memory 9 is read out again according to the read address supplied from the memory controlling means 8 and written into the output image memory 13 according to the write address supplied from the memory controlling means 8. Through the described process, the position of visual point with respect to the planar model P' or the model P''' having varying height can be changed.

At step SP10, the operator determines, from the display on the monitor 14, whether or not a desired state is attained as the result of the setting or change of the position of the visual point with respect to the planar model performed at step SP9. When the desired state is attained, the process is ended at the following step SP11. That is, the setting of the position of visual point and the correction of the picture image are performed between the operator and the image processing apparatus 1 in an interactive manner.

According to the present invention, even if the image pickup angle of the television camera 2 with respect to the golf course 3 and the like is fixed as shown in FIG. 1, the position of the visual point with respect to the golf course 3 displayed on the monitor 14 can be optionally changed. Therefore, it is easy to change the position of the visual point such that it appears that the television camera 2 is elevated to pick up the image of the golf course 3 from directly above. Thus, the sense of perspective can be easily simulated.

Further, when the heights h(u, v) of the object such as the golf course are given by such an information source as a topographical map, the model P''' having varying height is produced as described above and the video data is mapped thereon, whereby, even if the position of visual point is changed, the varying height of the ground can be correctly reproduced on the monitor 14.

Although the golf course was used as an example of the object in the above description of the embodiment, various other places such as baseball grounds can of course be used as the object in the present invention.

Further, a picture image obtained by mapping image data, which is obtained by picking up the image of a golf course or the like, onto a planar model produced by approximating the golf course or the like to a plane may be combined with a picture image obtained by mapping image data, which is obtained by picking up the image of humans, trees, and the like, onto a planar model produced by approximating the trees, humans, and the like to a plane, and thereby, a model of the golf course or the like having the trees, humans, or the like may be produced in a three-dimensional coordinate system.

What is claimed is:

1. An apparatus for processing an image of an object capable of moving the apparent position of the visual point from which the object is viewed with respect to an image displayed on a monitor, comprising:
    a. a camera having an image pickup device for picking up an image of said object;
    b. producing means for producing a model of a surface of said object in a three-dimensional coordinate system based on the coordinates of picture elements on the image pickup device of said camera and the image pickup angle of said camera with respect to said object;
    c. mapping means for mapping image data output from said camera onto said model produced by said producing means;
    d. transformation means for rotationally transforming said model with said image data mapped thereon in said three-dimensional coordinate system such that the apparent visual point is changed; and
    e. a monitor for displaying said model with said image data mapped thereon.

2. The apparatus for processing an image according to claim 1, further comprising deformation means for deforming a specific portion of said model with said image data mapped thereon to compensate for the apparent change in height of items which do not lie flat on the surface of said object.

3. An apparatus for processing an image of an object capable of moving the apparent position of the visual point from which the object is viewed with respect to an image displayed on a monitor, comprising:
    a. a camera having an image pickup device for picking up an image of said object;
    b. angle measuring means for measuring the image pickup angle of said camera with respect to said object;
    c. producing means for producing a model of a surface of said object in a three-dimensional coordinate system based on the coordinates of picture elements on the image pickup device of said camera and the image pickup angle of said camera with respect to said object;
    d. mapping means for mapping image data output from said camera onto said model produced by said producing means;
    e. transformation means for rotationally transforming said model with said image data mapped thereon in said three-dimensional coordinate system such that the apparent visual point is changed; and
    f. a monitor for displaying said model with said image data mapped thereon.

4. The apparatus for processing an image according to claim 3, further comprising deformation means for deforming a specific portion of said model with said image data mapped thereon to compensate for the apparent change in height of items which do not lie flat on the surface of said object.

5. The apparatus for processing an image according to claim 3, wherein said object is of varying height and said producing means further comprises:
    planar model producing means for producing a planar model by approximating to a plane the surface of said object based on coordinates of picture elements on the image pickup device of said camera and said image pickup angle; and
    means for modifying said planar model based on data representative of the varying height of said surface of said object.

6. The apparatus for processing an image according to claim 5, further comprising deformation means for deforming a specific portion of said model with said image data mapped thereon to compensate for the apparent change in height of items which do not lie flat on the surface of said object.

7. An apparatus for processing an image of an object of varying height capable of moving the apparent position of the visual point from which the object is viewed with respect to an image displayed on a monitor, comprising:
    a. a camera having an image pickup device for picking up an image of said object;
    b. planar model producing means for producing a planar model of the surface of said object in a three-dimensional coordinate system by approximating to a plane the surface of said object based on the coordinates of picture elements on the image pickup device of said camera and the image pickup angle of said camera with respect to said object;
    c. means for modifying said planar model based on data representative of the varying height of said surface of said object;
    d. mapping means for mapping image data output from said camera onto said model produced by said producing means;
    e. transformation means for rotationally transforming said model with said image data mapped thereon in said three-dimensional coordinate system such that the apparent visual point is changed; and
    f. a monitor for displaying said model with said image data mapped thereon.

8. The apparatus for processing an image according to claim 7, further comprising deformation means for deforming a specific portion of said model with said image data mapped thereon to compensate for the apparent change in height of items which do not lie flat on the surface of said object.

* * * * *